United States Patent [19]
Yuyama et al.

[11] Patent Number: 5,927,546
[45] Date of Patent: Jul. 27, 1999

[54] TABLET FEEDER

[75] Inventors: Shoji Yuyama; Naoki Koike; Tasuku Minami, all of Toyonaka, Japan

[73] Assignee: Kabushiki Kaisha Yuyama Seisakusho, Osaka, Japan

[21] Appl. No.: 08/848,863

[22] Filed: May 1, 1997

[30]     Foreign Application Priority Data

May 31, 1996 [JP] Japan ................................. 8-138100

[51] Int. Cl.⁶ .................................................. B65G 59/00
[52] U.S. Cl. ........................................... 221/265; 221/277
[58] Field of Search .................................. 221/167, 168, 221/265, 277, 258, 203, 182

[56]         References Cited

U.S. PATENT DOCUMENTS

| | | | |
|---|---|---|---|
| 4,420,095 | 12/1983 | Galoob | 221/265 |
| 4,903,861 | 2/1990 | Yuyama | 221/265 |
| 5,074,824 | 12/1991 | Suris | 221/265 |
| 5,443,179 | 8/1995 | Palmer et al. | 221/265 |

*Primary Examiner*—Kenneth Noland
*Attorney, Agent, or Firm*—Wenderoth, Lind & Ponack, L.L.P.

[57]          ABSTRACT

A tablet feeder can smoothly and continuously discharge all tablets in a case to the last one. The tablet feeder includes a tablet storage case and a support member. A rotor is rotatably mounted in the case on an inner bottom thereof. A plurality of pockets are formed in the outer periphery of the rotor at predetermined intervals. The rotor is rotated by a motor through a gear. A high-friction member is provided on the inner bottom of the case to prevent tablets from remaining on a boundary between the rotor and the inner bottom while bridging the rotor and the inner bottom.

5 Claims, 3 Drawing Sheets

TABLET FEEDER

BACKGROUND OF THE INVENTION

This invention relates to an improvement in a tablet feed mechanism of a tablet feeder for feeding tablets or capsules.

A tablet feeder is a device for feeding tablets to a tablet packaging device. Various kinds of tablet feeders are known. One known type of tablet feeder includes a tablet storage case having a rotor rotatably mounted in a bottom portion thereof. The case is mounted so as to be detachable in a horizontal direction relative to a support that carries a motor for driving the rotor.

The support of this tablet feeder has a discharge passage through which tablets are discharged obliquely downwardly. The rotor has pockets in its outer periphery. Tablets drop into the pockets of the rotor and then into the discharge passage when each pocket registers with the discharge passage. The tablets are then discharged downwardly.

The rotor of this tablet feeder is diamond-shaped and is rotatably received in a conical recess formed in the inner bottom of the case. Ordinarily, the rotor and the inner bottom member are made of the same plastic material. A recess is formed along the boundary between the inner bottom of the case and the rotor. Tablets tend to get stuck in this recess.

When tablets become scarce in the case, they tend to circle along the boundary between the rotor and the case inner bottom together with the rotor. It is difficult to cause such tablets to drop into the pockets of the rotor. Thus, it is difficult to completely discharge all the tablets from the case. As far as is known, there is no conventional tablet feeder which is free of this problem.

An object of this invention is to provide a tablet feeder which can discharge every last tablet in the case.

SUMMARY OF THE INVENTION

According to this invention, there is provided a tablet feeder comprising a tablet storage case having an inner bottom, a rotor rotatably mounted in the tablet storage case on the inner bottom, a support on which is detachably mounted the case, a motor mounted in the support for driving the rotor, the rotor being formed with a plurality of pockets in its outer periphery at angular intervals, the support being formed with a tablet discharge passage, the pockets being arranged so as to register one after another with the tablet discharge passage to discharge tablets in the pockets as the rotor is rotated, and at least one high-friction member provided on the inner bottom of the case.

The tablet storage case of the tablet feeder of this invention is detachably mounted on the support member. A predetermined number of tablets are supplied into the case. When the rotor is rotated in this state, tablets are discharged one after another.

When tablets in the case become scarce, some of them may be rotated by the rotor while bridging the rotor and the case inner bottom. It is difficult to cause such tablets to drop into the pockets in the rotor. According to this invention, the high-friction member provided on the case inner bottom changes the position of such tablets and causes them to drop into the immediately rear pocket of the rotor. Thus, it is possible to discharge all the tablets in the case.

Other features and objects of the present invention will become apparent from the following description made with reference to the accompanying drawings, in which:

DETAILED DESCRIPTION OF THE PREFERRED EMBODIMENT

An embodiment of this invention will now be described with reference to the drawings.

Figure 1:
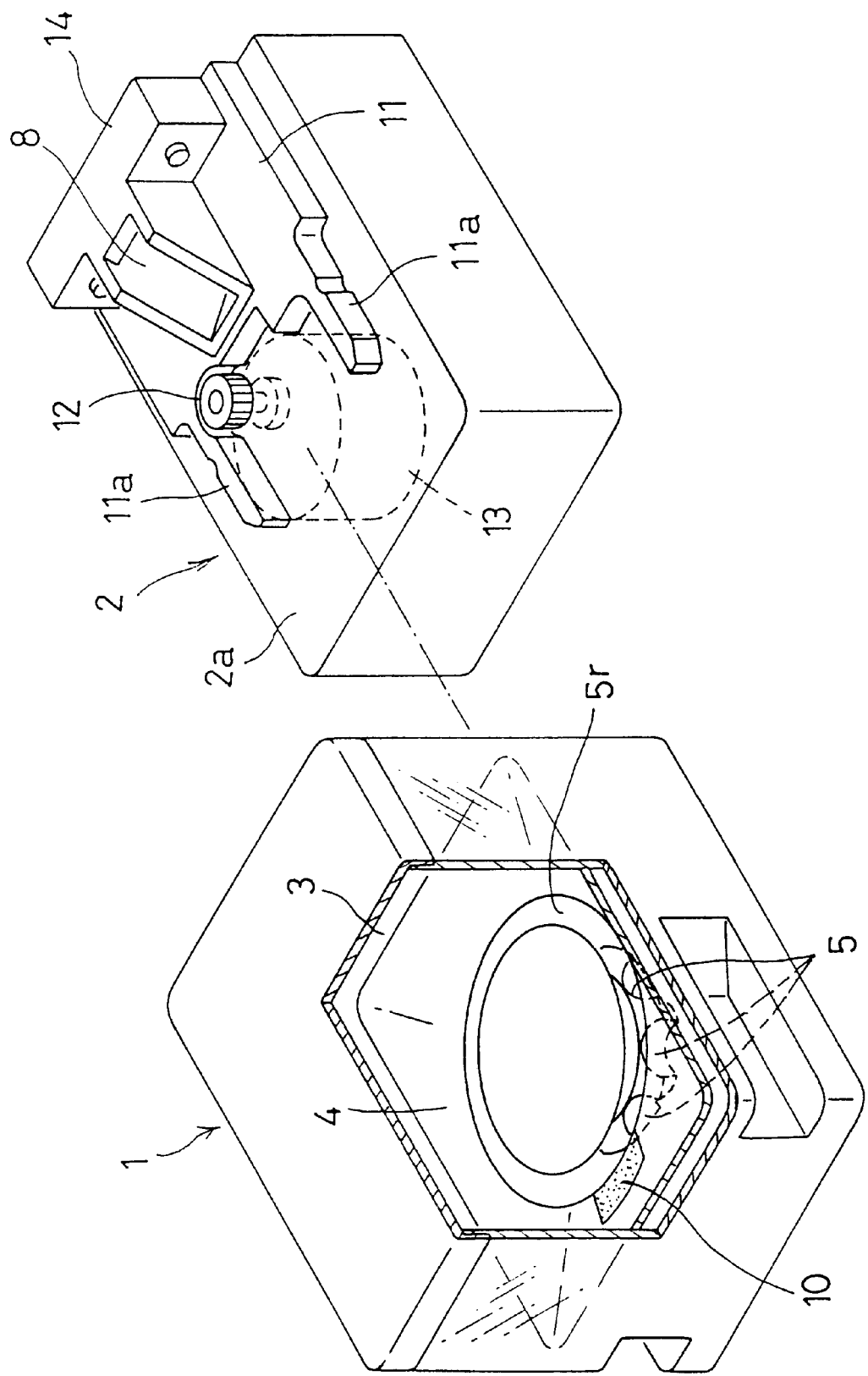
FIG. 1 is an exploded perspective view of a tablet feeder of an embodiment of the invention.

FIG. 1 is an exploded perspective view of a tablet feeder of the embodiment. The structure of the tablet feeder of this embodiment is basically known. Description thereof will therefore be limited to a minimum. As shown, the tablet feeder comprises a tablet storage case 1 and a support 2 on which the case 1 is detachably mounted.

Figure 2:
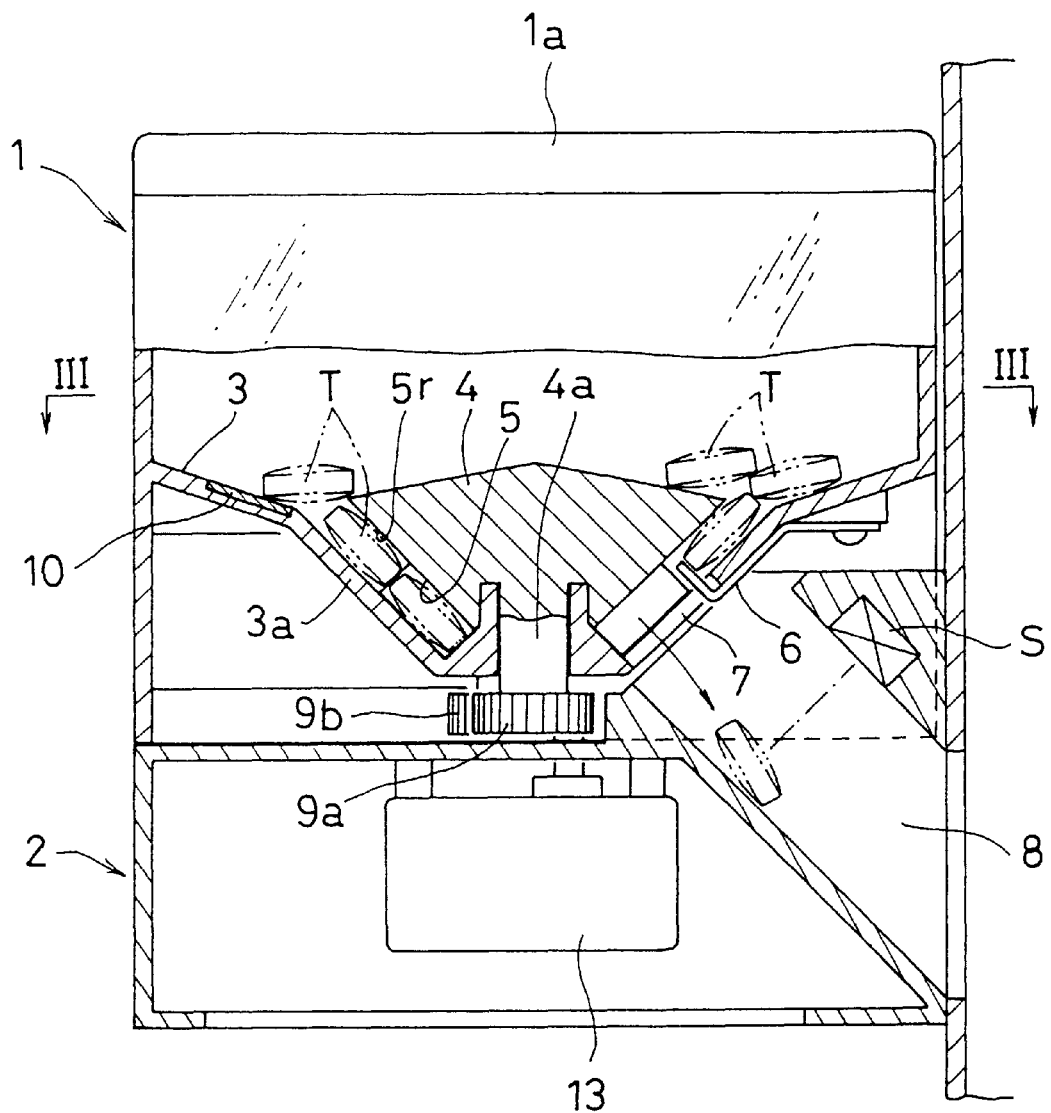
FIG. 2 is a partial sectional view of FIG. 1.
Figure 3:
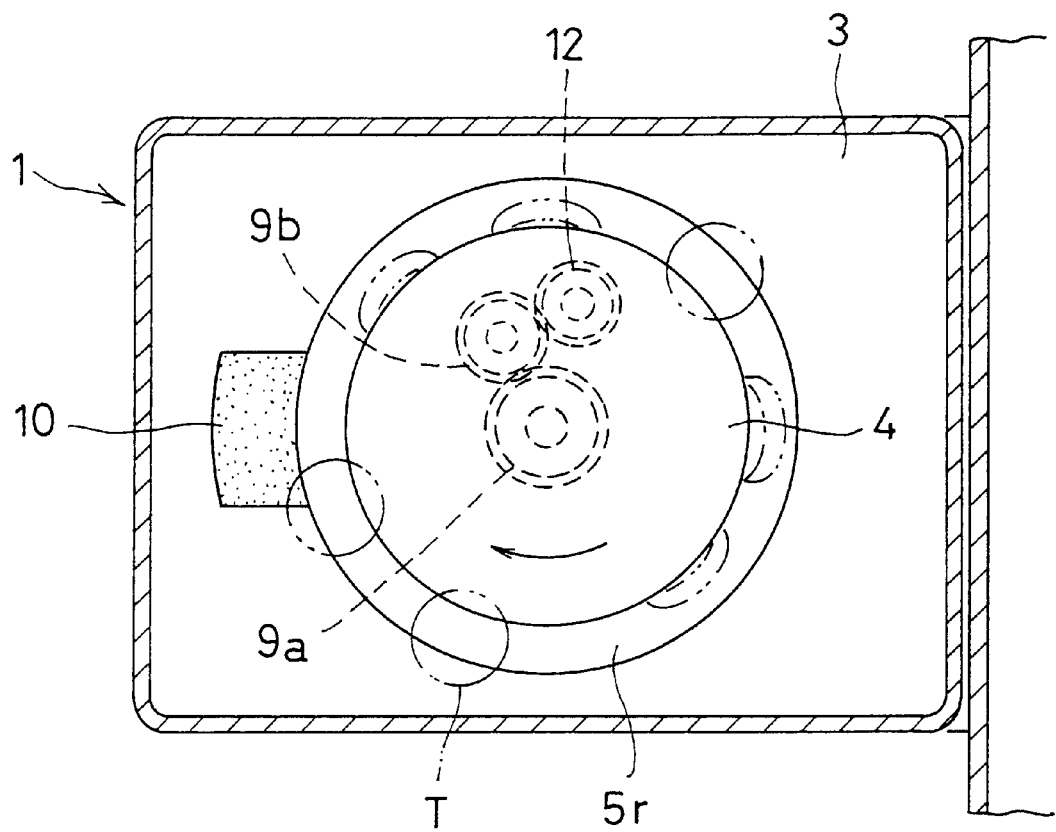
FIG. 3 is a sectional view taken along line III—III of FIG. 2.

The tablet storage case 1 has an inner bottom 3 formed with a conical recess 3a at its center. A rotor 4 is received in the recess 3a and rotated by a rotary shaft 4a. The rotor 4 has a groove 5r completely circling the outer periphery thereof for dropping tablets T, and pockets 5 formed under the groove 5r at predetermined intervals. As shown in FIG. 2, a retaining plate 6 having an L-shaped tip is provided opposite to a discharge passage 8 formed in the support 2. Numeral 7 indicates an opening.

A rotary gear 9a is connected to the bottom of the rotary shaft 4a of the rotor 4. A second gear 9b is in mesh with the gear 9a. Both gears are mounted on the bottom plate in the case 1. Numeral 10 indicates a high-friction member made of silicone rubber provided on the inner bottom plate of the case. The high-friction member 10 may be made of rubber, wood or paper. Small protrusions may be formed on its surface at proper intervals.

Mounted on the support 2 is a guide plate 11 having arms 11a at opposite ends for engaging the case 1. The arms 11a have recesses formed in the outer sides thereof. While not shown, the case 1 has protrusions on its inner bottom. By fitting the protrusions in the recesses in the arms 11a, the case 1 is coupled to the support 2.

A driving gear 12 is provided at one corner of the guide plate 11. It is coupled to a motor 13 mounted in the support 2 by a rotary shaft. When the case 1 is mounted on the support 2, the gear 12 meshes with the rotary gear 9b in the case 1, so that the rotor 4 can be rotated by the motor 13. Numeral 14 in FIG. 1 indicates a mounting block mounted on the guide plate 11. The discharge passage 8 is formed in the block 14. A sensor S is provided in the passage 8 to detect the passage of tablets.

The operation of the tablet feeder of this embodiment is now described. A predetermined number of tablets are supplied into the case 1 of the tablet feeder, a lid 1a thereof is closed, and the rotor 4 is rotated. When one of the pockets 5 registers with the discharge passage 8, the lower one of two tablets in the pocket 5 drops into the discharge passage 8. When the rotor 4 further rotates and the pocket moves clear of the retaining plate 6, the upper tablet therein will drop to the lower level in the pocket and another tablet moves into the pocket. By this time, the next pocket will come into register with the discharge passage 8, so that the lower one of the tablets therein drops into the passage 8. Tablets in the pockets are thus dropped one after another into the passage 8.

When tablets T are discharged from the case 1 in the above manner and the tablets T remaining in the case 1 become scarce, tablets scattered at the boundary between the inner bottom 3 of the case and the rotor 4 tend not to move into the pockets 5 but stay at the boundary or circle along such boundary at the same speed as the rotating speed of the rotor while bridging recesses between the pockets 5. It is difficult to cause such tablets to drop into the pockets. Thus, in a conventional feeder, it was often impossible to discharge all the tablets in the case. The feeder of the invention can completely discharge all the tablets in the case.

In the invention, the high-friction member 10 is provided on the inner bottom 3 of the case. When any tablet bridging the rotor 4 and the inner bottom 3 of the case moves onto the high-friction member 10, such tablet will be retarded from further rotation due to frictional resistance by the high-friction member 10. Thus, the tablet will change its position while moving backward relative to the rotor, so that it drops into the immediately rear pocket 5 and is discharged into the discharge passage 8.

A single high-friction member 10 is used in the embodiment. But a plurality of such members may be employed.

According to this invention, the high-friction member is mounted on the inner bottom of the case that is detachably mounted on the support. Even if some tablets are on the boundary between the rotor and the case inner bottom when the tablets in the case become scarce, their position will be changed by the rotating rotor when they are moved onto the high-friction member, so that the tablets will drop into the pockets in the rotor. It is thus possible to smoothly and continuously discharge all the tablets in the case to the last one.

What is claimed is:

1. A tablet feeder comprising:

a tablet storage case having an inner bottom;

a rotor rotatably mounted in said tablet storage case on said inner bottom, said rotor having formed in an outer periphery thereof a plurality of pockets spaced at angular intervals;

a support having a rotor-rotating motor and a tablet discharge passage;

said tablet storage case with said rotor being detachably mountable on said support in a position such that said motor is operable to rotate said rotor and such that as said rotor rotates said pockets register one after another with said tablet discharge passage to thereby discharge tablets in said pockets through said tablet discharge passage; and at least one high-friction member provided in said case on said inner bottom, said high-friction member being located at a position adjacent to and outwardly of said pockets such that said high-friction member does not overhang said pockets.

2. A tablet feeder as claimed in claim 1, wherein said high-friction member is formed of silicone rubber.

3. A tablet feeder as claimed in claim 1, wherein said high-friction member is positioned entirely radially outwardly of a boundary between said inner bottom and said rotor.

4. A tablet feeder as claimed in claim 1, wherein said high-friction member is fixed entirely to said inner bottom.

5. A tablet feeder as claimed in claim 1, wherein said high-friction member has a radially inner end that is positioned radially outwardly of said rotor.

* * * * *